(12) United States Patent
Zhu et al.

(10) Patent No.: US 10,579,062 B2
(45) Date of Patent: Mar. 3, 2020

(54) SCALABLE SMOOTH REFERENCE PATH GENERATOR FOR AUTONOMOUS DRIVING VEHICLES

(71) Applicant: Baidu USA LLC, Sunnyvale, CA (US)

(72) Inventors: Weicheng Zhu, Sunnyvale, CA (US); Li Zhuang, Sunnyvale, CA (US); Qi Luo, Sunnyvale, CA (US); Qi Kong, Sunnyvale, CA (US); Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 137 days.

(21) Appl. No.: 15/610,064

(22) Filed: May 31, 2017

(65) Prior Publication Data
US 2018/0348761 A1 Dec. 6, 2018

(51) Int. Cl.
| | |
|---|---|
| G05D 1/02 | (2006.01) |
| G08G 1/16 | (2006.01) |
| B60W 30/095 | (2012.01) |
| B62D 15/02 | (2006.01) |
| G01C 21/34 | (2006.01) |

(52) U.S. Cl.
CPC ......... *G05D 1/0212* (2013.01); *B60W 30/095* (2013.01); *B62D 15/025* (2013.01); *G01C 21/34* (2013.01); *G08G 1/167* (2013.01); *B60W 2550/402* (2013.01); *G08G 1/163* (2013.01)

(58) Field of Classification Search
None
See application file for complete search history.

(56) References Cited

U.S. PATENT DOCUMENTS

| | | | |
|---|---|---|---|
| 6,385,539 B1* | 5/2002 | Wilson | G01C 21/30 340/905 |
| 8,718,932 B1* | 5/2014 | Pack | G01C 21/30 701/446 |
| 2015/0197246 A1* | 7/2015 | Nagasaka | B60W 30/10 701/1 |

OTHER PUBLICATIONS

Hui, Cheng, et al. "Autonomous takeoff, tracking and landing of a UAV on a moving UGV using onboard monocular vision." Control Conference (CCC), 2013 32nd Chinese. IEEE, 2013. (Year: 2013).*

(Continued)

*Primary Examiner* — Genna M Mott
(74) *Attorney, Agent, or Firm* — Womble Bond Dickinson (US) LLP

(57) ABSTRACT

In one embodiment, a computer system generates a first vehicular path based on map information. The system collects data points representing geographical coordinates of vehicles that drove on a vehicular path lane at different points in time. The system segments the first vehicular path into path segments based on the collected data points. For each of the path segments, the system applies a smoothing function to select a subset of the data points that are within a predetermined proximity of the corresponding path segment and calculates a segment reference point to represent the path segment by combining the selected data points. The segment reference points of the path segments of the first vehicular path are interpolated to generate a second vehicular path such that the second vehicular path is used as a reference line to control ADVs driving on the first vehicular path.

16 Claims, 10 Drawing Sheets

(56) References Cited

OTHER PUBLICATIONS

Jun, Jungwook, Randall Guensler, and Jennifer H. Ogle. "Smoothing methods to minimize impact of global positioning system random error on travel distance, speed, and acceleration profile estimates." Transportation Research Record 1972.1 (2006): 141-150. (Year: 2006).*

H. Martinez-Alfaro and D. R. Flugrad, "Collision-free path planning for mobile robots and/or AGVs using simulated annealing," Proceedings of IEEE International Conference on Systems, Man and Cybernetics, San Antonio, TX, USA, 1994, pp. 270-275 vol. 1. (Year: 1994).*

* cited by examiner

| Path Points Table | | |
|---|---|---|
| Key | Value | |
| 601 | {x1, y1} | |
| 602 | {x2, y2} | |
| 603 | {x3, y3} | |
| 604 | {x4, y4} | |
| 605 | {x5, y5} | |
| 606 | {x6, y6} | |
| ... | ... | |

FIG. 7B

| Path Sections Table | | |
|---|---|---|
| Key | Value | |
| 601 | 602 | |
| 602 | 603 | |
| 603 | 604 | |
| 604 | 605 | |
| 605 | 606 | |
| 606 | 607 | |
| ... | ... | |
| 621 | 622 | |
| 622 | 623 | |
| 623 | ... | |

SCALABLE SMOOTH REFERENCE PATH GENERATOR FOR AUTONOMOUS DRIVING VEHICLES

TECHNICAL FIELD

Embodiments of the present invention relate generally to operating autonomous vehicles. More particularly, embodiments of the invention relate to scalable smooth reference path generator for autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Driving path trajectory planning is a critical operation in autonomous driving vehicles (ADVs). A feasible trajectory may be planned based on perceptions of obstacles and road information surrounding an ADV. Road information such as specific curvatures on the road and obscure markers on the road complicates driving path trajectory planning. A naïve solution is to find continuously midpoints of the edges of a road lane and to connect these mid points. This solution however generates sudden changes in a path trajectory.

BRIEF DESCRIPTION OF THE DRAWINGS

Embodiments of the invention are illustrated by way of example and not limitation in the figures of the accompanying drawings in which like references indicate similar elements.

FIGS. 7A-7B are block diagrams illustrating a path sections table and a path points table respectively according to one embodiment of the invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a system and a method for generating a reference path for operating an autonomous driving vehicle (ADV) is disclosed. The system generates a first vehicular path based on a map information. The system collects data points representing geographical coordinates of vehicles that drove on the vehicular path at different points in time. The system segments the first vehicular path into discrete path segments based on the collected data points. For each of the path segments, the system applies a smoothing function to select a subset of the collected data points that are within a predetermined proximity of the corresponding path segment, and calculates a segment reference point to represent the path segment by combining the selected data points. A second vehicular path is generated by interpolating the segment reference points of the path segments. The second vehicular path is used as a reference line for controlling ADVs driving on the first vehicular path later on.

Figure 1:
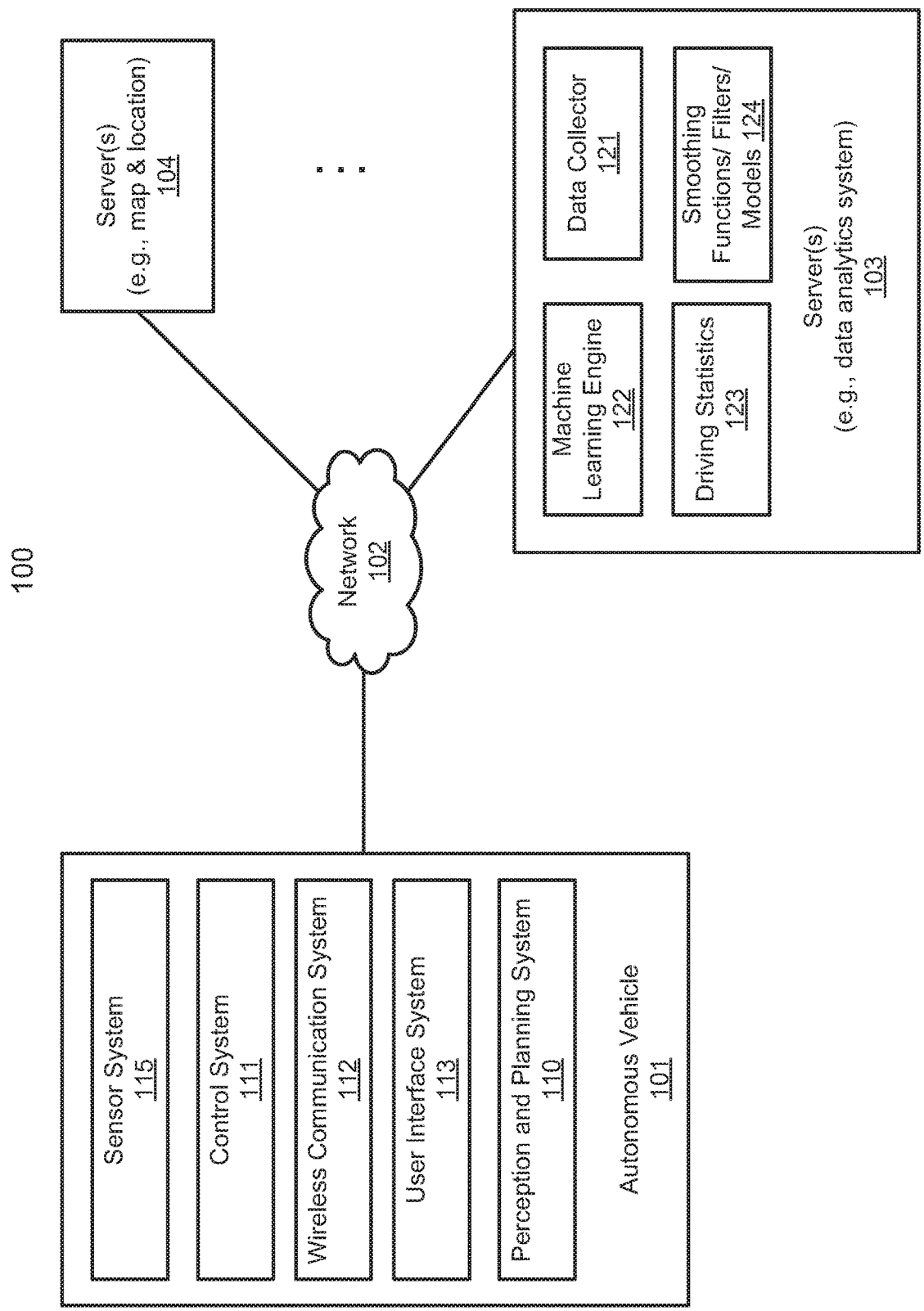
FIG. 1 is a block diagram illustrating a networked system according to one embodiment of the invention.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
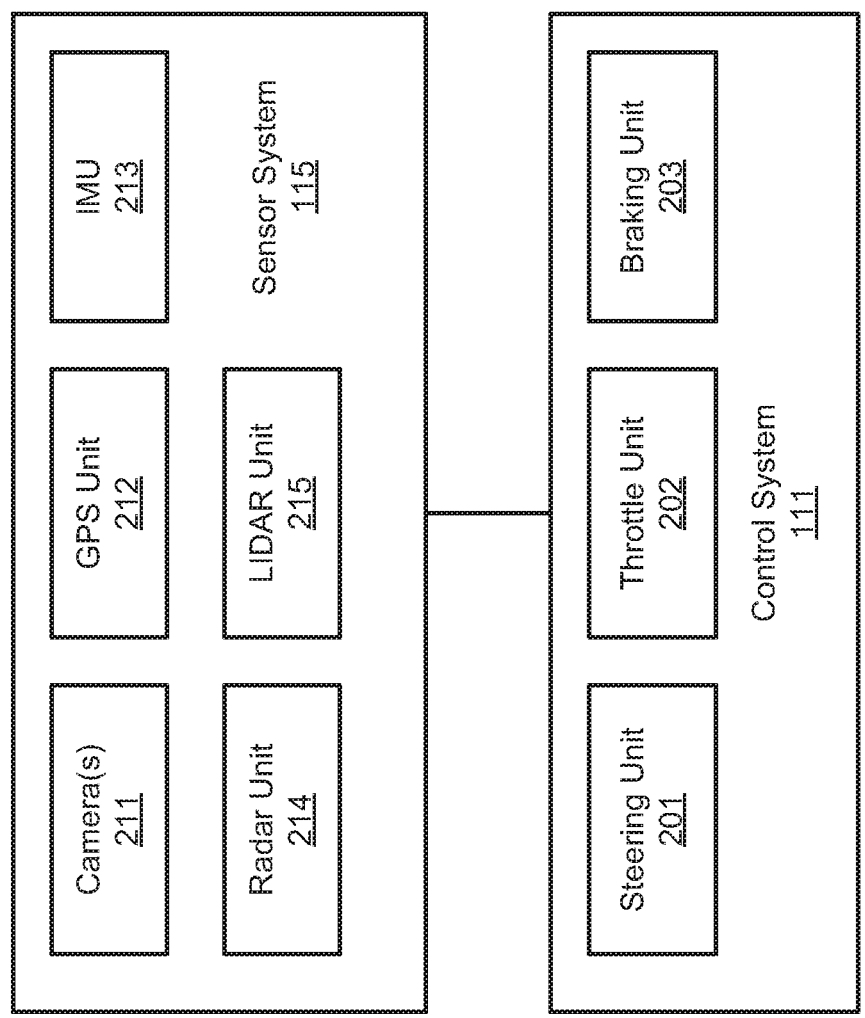
FIG. 2 is a block diagram illustrating an example of an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, smoothing functions, and/or algorithms 124 for a variety of purposes. In some embodiments, machine learning engine 122 use algorithm 124 to generate a first vehicular path, or first reference line, based on map data information for a vehicular lane. For example, machine-learning engine 122 may generate a reference line for a vehicular lane by connecting midpoints of two opposing curbs or extremities of the vehicular lane provided by the map data. Based on the first reference line and collected data points representing geographical coordinates of vehicles driven on path at different points in time, engine 122 segments the first reference line into discrete segments. Engine 122 may segment the first reference line based on a map geographical location or a road condition. In another embodiment, engine 122 may simply segment the first reference line based on a predetermined segment length.

For each of the path segments, engine 122 selects a subset of collected data points within a predetermined proximity of the path segment by applying a smoothing function to the data points of the path segment, and calculates a segment reference point by combining the selected data points. Based on segment reference points of the path segments, engine 122 may generate a second vehicular path or reference line by interpolating these segment reference points such that the second reference line is used as a reference line for controlling ADVs on the first vehicular path/lane in the future. In some embodiments, a segment reference points table and a path segments table representing the reference lines are uploaded to ADVs such that ADVs can generate a reference line for a vehicular path based on the ADVs' geographical location and driving direction. For example, an ADV can look up a path segment identifier using the ADV's geographical location and driving direction. Based on a path segment identifier, the ADV can look up a segment reference point for the path segment identifier and subsequent path segment identifiers/segment reference points to generate a reference line for controlling the ADV on the vehicular path.

Figure 3:
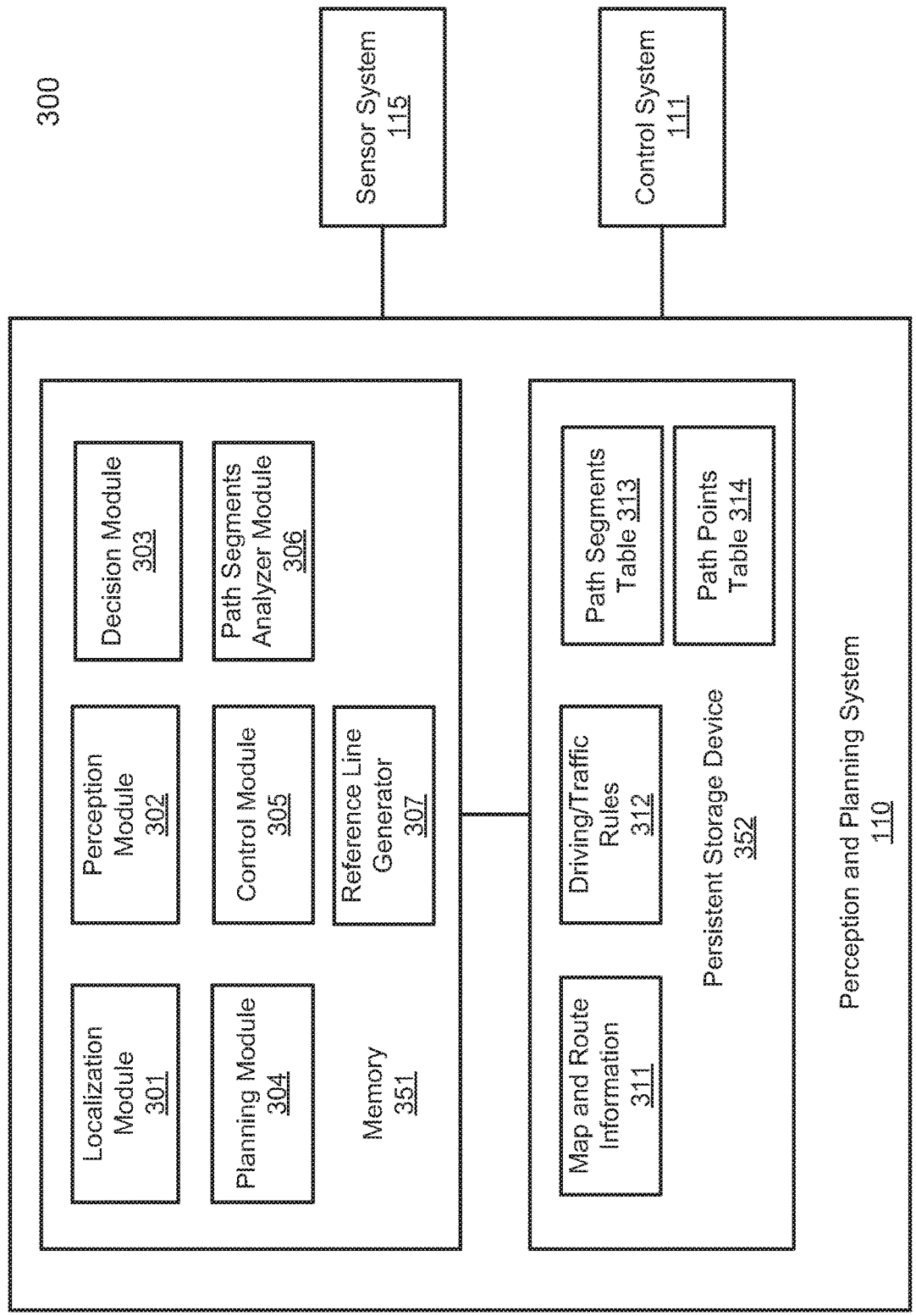
FIG. 3 is a block diagram illustrating an example of a perception and planning system used with an autonomous vehicle according to one embodiment of the invention.

FIG. 3 is a block diagram illustrating an example of a perception and planning system used with an autonomous vehicle according to one embodiment of the invention. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, decision module 303, planning module 304, control module 305, path segments analyzer module 306, and reference line generator 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules or driving rules 312, which may be stored in persistent storage device 352.

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 304 plans a next route segment or path segment, for example, including a target position and the time required for the ADV to reach the target position. Alternatively, planning module 304 may further specify the specific speed, direction, and/or steering angle, etc. In one embodiment, planning module 304 plans a route segment or path segment for the next predetermined period of time such as 5 seconds. For each planning cycle, planning module 304 plans a target position for the current cycle (e.g., next 5 seconds) based on a target position planned in a previous cycle. Control module 305 then generates one or more control commands (e.g., throttle, brake, steering control commands) based on the planning and control data of the current cycle.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

In some embodiments, decision module 303/planning module 304 may determine a reference path or reference lines via path segments analyzer module 306 to control the ADV on a vehicular path/lane. For example, based on a geographical location of the ADV, path segments analyzer module 306 may query a path points table containing name value pairs of path segments identifiers and previously generated segment reference points, such as path points table 314 of persistent storage device 352, for the closest proximate segment reference points for the current location of the ADV. From the segment reference points, system 110 determines the path segments of interest. For the segment reference points, or path segments of interest, system 110 looks ahead and identify how the segment reference points or path segments are routed, e.g., by querying a path segments table containing name-value pairs of start-end path segments by identifiers, such as path segments table 313, for interested path segments to determine their connected path segments. For the connected path segments, reference line generator 307 queries path points table 314 to determine their respective segment reference points. Reference line generator 307 interpolates the segment reference points to generate a reference line to control the ADV.

In another embodiment, path segment identifiers may be referenced to a map route. For example, system 110 may include a table that references a street/route to one or more path segments (not shown), so that system 110 may determine related path segments based on map information. For illustration, while an ADV is online, system 110 determines a geographical location and direction of the ADV based on sensor information of the ADV. From the sensor information and map information, system 110 determines that the ADV is on a particular road/route/lane. System 110 looks up a database table for the one or more path segments corresponding to the particular road/route/lane. Based on the identified path segments, ADV looks up segment reference points from segment reference points table 314 for the path segments and subsequent path segments/segment reference points to interpolate the segment reference points to generate prospective reference paths, e.g., a second reference path line. Prospective reference paths, e.g., a second reference path line, can then be used to control the ADV on the same or similar vehicular path/lane.

In another embodiment, path analyzer 306 generates a reference line to control the ADV while the ADV is online. An ADV is online when it is engaged in an autonomous driving task. For example, table points table 314 or path segments table 313 may be a blank table, or the information may not be downloaded from a server with respect to a particular geographical location. In this scenario, path analyzer 306 may generate a first reference line based on ADV's GPS location and sensed or retrieved map information by generating midpoints of the current vehicular lane and connecting these midpoints. Path analyzer 306 next determines data points representing geographical coordinates of vehicles (data collected by this ADV and/or other motorized vehicles) traveled on the vehicular path/lane of interest. Based on the data points, path analyzer 306 segments the first reference line into path segments. For each of the path segments, path analyzer 306 selects a subset of the collected points that are within a predetermined proximity to the corresponding path segment by applying a smoothing function to the selected data points, and calculates a segment reference point by combining the selected smoothed data points. Finally reference line generator 307 generates a second reference line by interpolating each of the segment reference points for controlling ADVs on the vehicular path. In another embodiment, more than one segment reference points are generated for a path segment.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Figure 4:
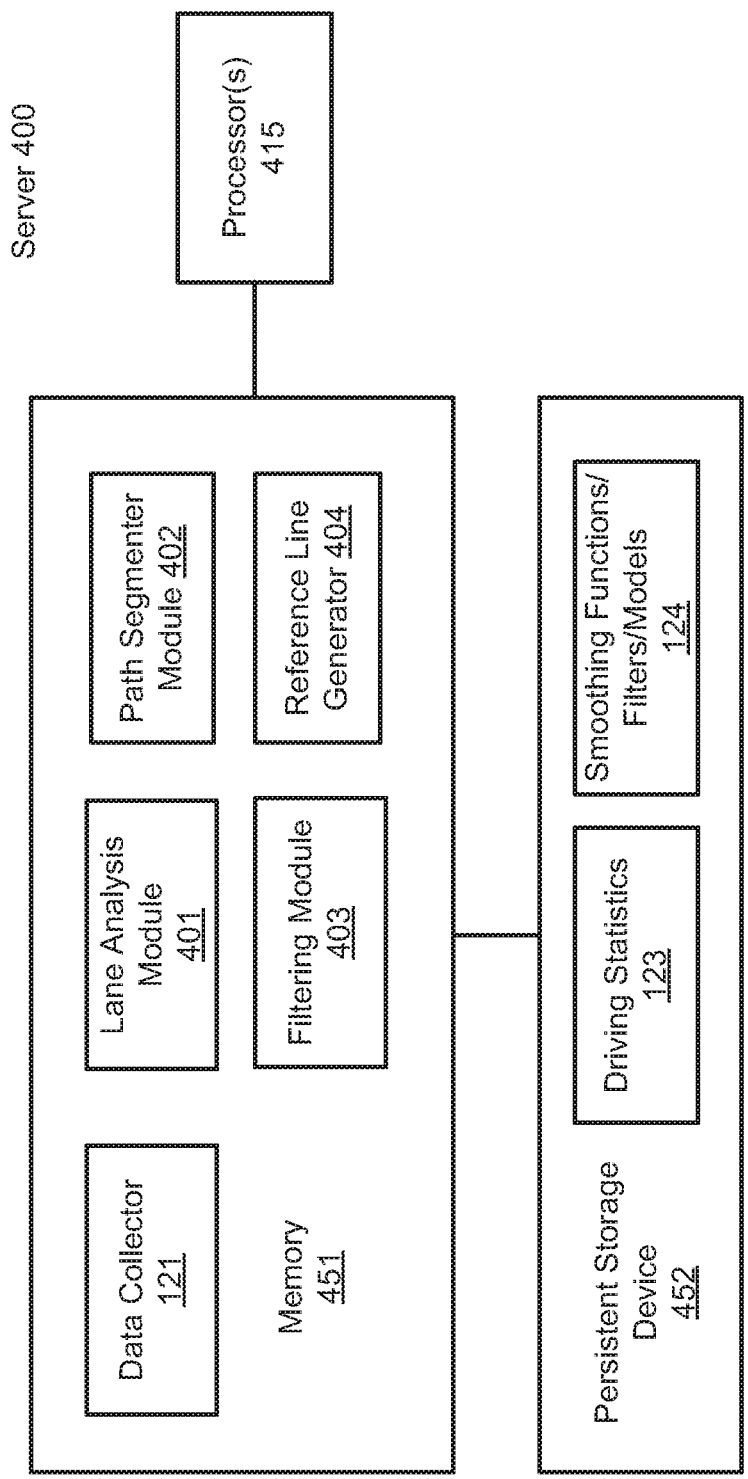
FIG. 4 is a block diagram illustrating an example of a data analytics system according to one embodiment of the invention.

FIG. 4 is a block diagram illustrating an example of a data analytics system according to one embodiment of the invention. Data analytics system or server 400 may be any of servers 103-104 of FIG. 1. Referring to FIG. 4, server 400 includes, but is not limited to, data collector 121, lane analysis module 401, path segmenter module 402, filtering module 403, and reference line generator 404. Some or all of modules 121, 401-404 may be implemented in software, hardware, or a combination thereof. For example, these modules may be installed in persistent storage device 452, loaded into memory 451, and executed by one or more processors 415. Some of modules 121, 401-404 may be integrated together as an integrated module.

As described above, data collector 121 collects driving statistics 123, including data points representing geographical coordinates and vehicle orientation/direction, from a variety of vehicles, either autonomous vehicles or regular vehicles driven by human drivers. Lane analysis module 401 determines a first reference line based of a map data information. Path segmenter module 402 segments the first vehicular path or reference line into discrete path segments based on the collected data points or driving statistics 123. For each of the path segments, filtering module 403 applies a filtering model of smoothing functions/filters/models 124 to select a subset of the collected data points that are within a predetermined proximity of the rest of the data points or within a predetermined proximity of the path segment. Filter module 403 applies a smooth function of smoothing functions/filters/models 124 to the selected data points and calculates a segment reference point by combining the selected data points. Reference line generator 404 generates a second vehicular path by interpolating, using interpolation model 124, the calculated segment reference points of the path segments such that the second vehicular path is used as a reference line for controlling ADVs driving on the first vehicular path.

Figure 5:
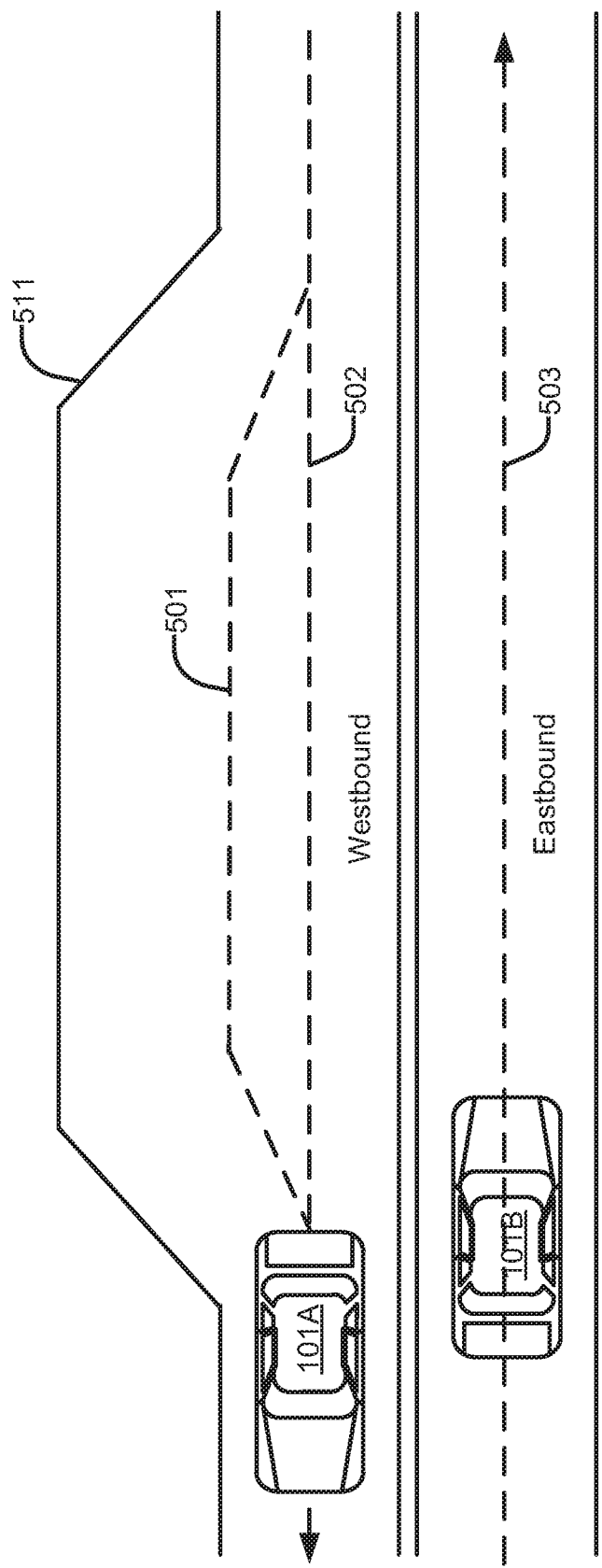
FIG. 5 is a block diagram illustrating an example road condition of autonomous vehicles according to one embodiment of the invention.

FIG. 5 is a block diagram illustrating an example road condition of autonomous vehicles according to one embodiment of the invention. Referring to FIG. 5, road 511 is a one lane, two way street. West bound has an extended curb for bus stop or passenger drop-off. Eastbound does not have an extended curb. In this scenario, a first reference line, such as reference line 501, is generated from only map data information. Reference line 501 is generated by interconnecting midpoints of the westbound lane of road 511 based on map data information. Reference line 501 however is not preferred and an ADV controlled by a reference line such as reference line 501 will experience sharp steering and sudden maneuvers. Reference lines such as reference lines 502-503 are typical of a route driven by human drivers on road 511 and are preferred over reference line 501.

Figure 6A:
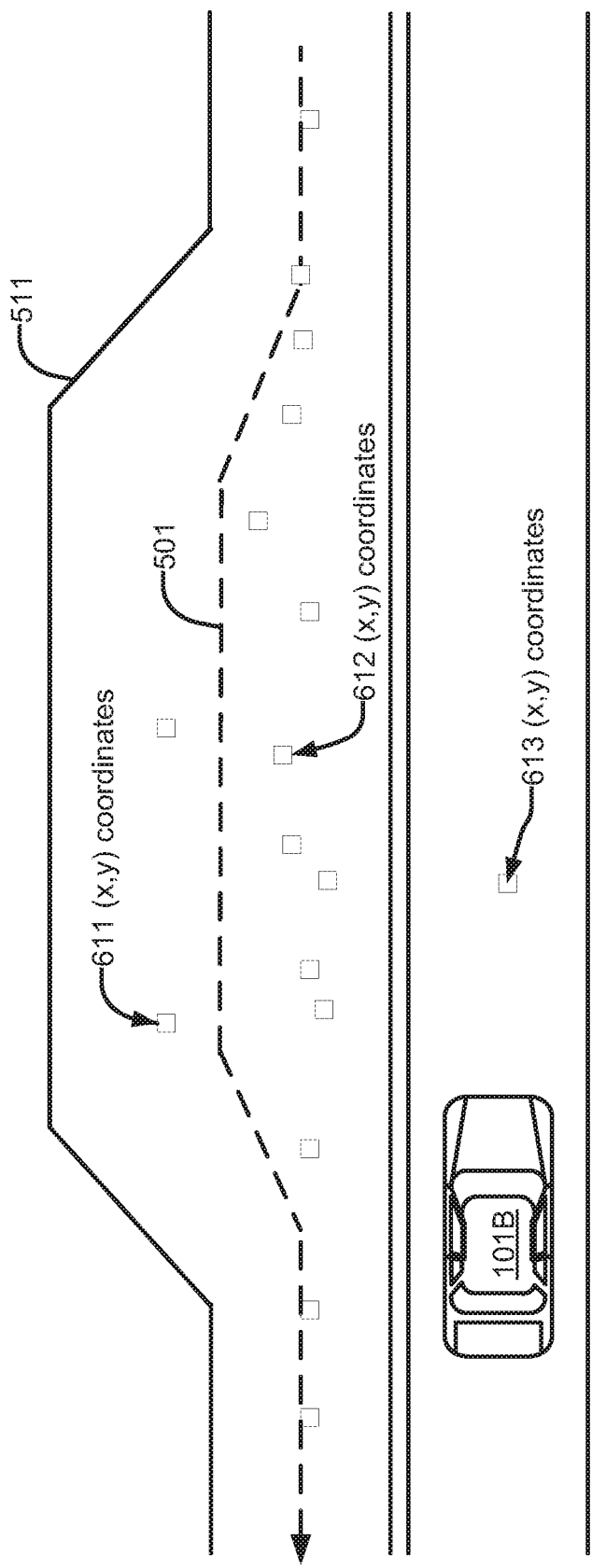
FIGS. 6A-6B are block diagrams illustrating an example road condition of autonomous vehicles with historical driving data, before and after a path is segmented, according to one embodiment of the invention.
Figure 6B:
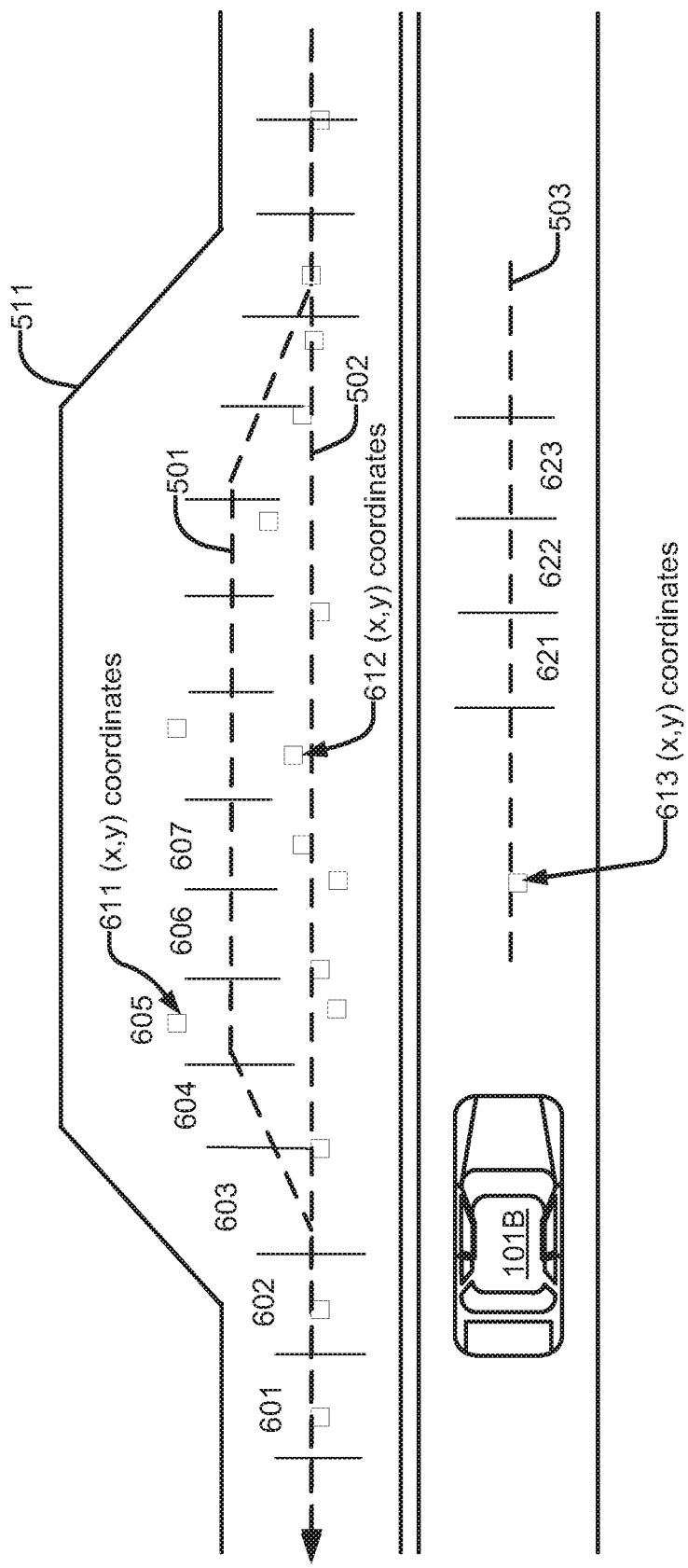

FIGS. 6A-6B are block diagrams illustrating an example road condition of autonomous vehicles with historical driving data, before and after a path is segmented, according to one embodiment of the invention. Referring to FIG. 6A, driving statistics 123 of FIG. 1 may contain many data points representing historical data points of motorized vehicles on road 511, such as data points 611-613. Data points 611-613 may be represented by an (x, y) coordinate or data points 611-613 may be represented by a relative point/coordinate (s, 1) (not shown), relative to a map-generated reference line, such as reference line 501, where (x, y) represent the two axis of a two-dimensional plane, s represents a longitudinal offset of the respective data point from an automatically generated segment reference point of a path segment of a map-generated reference line, and 1 represents a lateral offset from the map-generated reference line. If a relative or (s, 1) point is on the map-generated reference line then lateral offset has a value of zero. Here, any (x, y) coordinates may be converted into a (s, 1) coordinate based on an initial path segment and initial reference line.

Referring to FIG. 6B, based on the available data points of road 511, reference line 501 is segmented into path sections or segments such as segments 601-607. For example, reference line 501 may be segmented into 5 meter segments. However, if a five meter section of road 511 does not have any data points, a road section may be divided to 10 meter segments by the system. For each of the segments, the system selects a subset of the collected data points that are within predetermined proximity of the path segment. In another embodiment, the system selects a subset of the collected data points that are within predetermined proximity of the other data points corresponding to the segment, e.g., based on neighboring data points. Some outlier data points may not be selected or are filtered if it is determined to be outside some predetermined distance.

For the purpose of illustration, for example, data point 611 of FIG. 6B may be filtered, or removed, when a filtering algorithm is applied to path segment 605. Next, the system applies a smoothing function to the selected data points for each of the path segment. The system then calculates a segment reference point by combining the smoothed selected data points for each of the path segments. In one embodiment, combining selected data points includes applying a mean/averaging function to the selected points, In another embodiment, combining selected data points includes applying a mode (most frequently occurring point) function to the selected data points. In another embodiment, combining selected data points includes applying a weighted averaging function to the selected data points, e.g., data points close to each other have higher weights. The segment reference points of the path segments are interpolated to generate a second vehicular path, such that the second vehicular path is used as a reference line for controlling ADVs on the vehicular path.

In one embodiment, the smooth function includes a two-dimensional Gaussian blur function, such as:

$$G(x, y) = \frac{1}{2\pi\sigma^2} e^{\frac{-(x^2+y^2)}{2\sigma^2}},$$

parameters x, y are the two-dimensional planar coordinate of a data point, σ is a standard deviation of the Gaussian distribution, and G(x, y) is the Gaussian blurred data point or resulting data point. The system applies G(x, y) to each of the data points to adjust each of the data points to a weighted average of the neighboring values. In other words, data points at less frequently traveled routes will shift towards data points at more frequently traveled routes such that a higher weight is placed on routes that are frequently traveled. In another embodiment, the smoothing function may be a three-dimensional function having a z-axis component to include an elevation metric of the data points. In another embodiment, a two-dimensional Gaussian blur function applies smoothing to a first (e.g., x-axis) and a second (e.g., y-axis) dimension of the selected data points. In another embodiment, the smoothing function is applied to a first dimension (e.g., x-axis) independent of a smoothing applied to the second dimension (e.g., y-axis). In some embodiments, Gaussian blur is applied at various standard deviation values, i.e., σ value could be set to 1, 1.5, 2, or a variation thereof for each of the data points.

In one embodiment, a polynomial regression function is applied as the smoothing function. In some embodiments, different degrees (e.g., first, second, or third) of polynomial for the polynomial regression function may be applied. For example, for a path segment, a first degree polynomial regression function (linear), such as y=a+bx, where a and b are constants and (x, y) are planar coordinates, may be applied to a set of data points to approximate a best fit linear curve to the set of data points. In another embodiment, combining selected data points corresponding to the path segment may include determining a midpoint of a best fit curve to be the segment reference point of the path segment. The process is repeated to determine a segment reference point for each of the path segments. The segment reference points are interpolated to generate a second reference line for the ADV to follow as a reference path. In one embodiment, interpolating segment reference points of each of the path segments includes applying a spline function to the segment reference points. In another embodiment, interpolating segment reference points of each of the path segments includes applying a spiral path function to the segment reference points.

FIGS. 7A-7B are block diagrams illustrating a path sections table and a path points table respectively according to one embodiment of the invention. Referring to FIG. 7A, path sections table stores key-value pairs of path sections or segments. Each key-value pair represents an interconnection by a "key" path segment (e.g., source segment) to a "value" path segment (e.g., destination segment). For example, path sections table has a first row with key-value pair (601, 602) illustrating that path segment 601 is interconnected to path segment 602. The second row has key-value pair (602, 603) illustrating that path segment 602 is connected to path segment 603, and so forth. Each path segment has unique start-end coordinates. In other words, there are no two distinct path segments that have overlapping start and end points.

Referring to FIG. 7B, path points table stores key-value pairs of path segments and their corresponding segment reference point(s). For example, a key-value pair (601, {(x1, y1)}) illustrates that path segment 601 has a single segment reference point at coordinates (x1, y1). The (x1, y1) coordinates may alternatively be stored as a (s, 1) or relative coordinate as described above. Variations of the path sections table and path points table may be implemented. For example, in some embodiments, path sections table and/or path points table may be stored as a database table or multiple database tables, a linked list, a tree structure, or any other suitable data structures. In another embodiment, path sections table and path points table may be combined into a single table. As described above, in some embodiments, the path sections table and the path points table may be referenced by map information such as map routes/paths. While an ADV is online, the ADV based on its GPS coordinates looks up path segments and segment reference points, via the path sections table and the path points table, for map routes/paths and interpolates the segment reference points according to its path segments to generate a prospective reference path to control the ADV driving on the map routes/paths.

Figure 8:
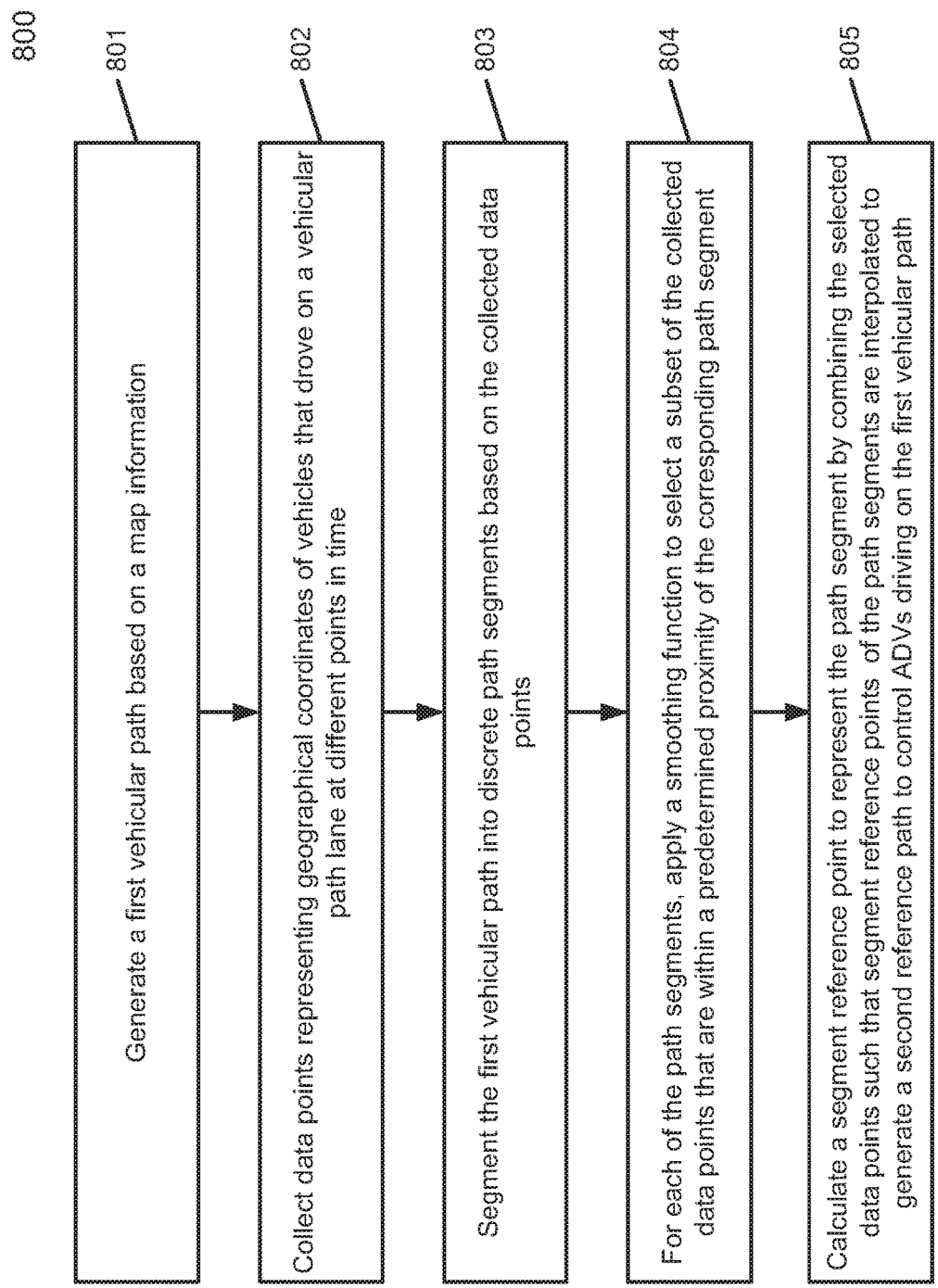
FIG. 8 is a flow diagram illustrating a process to generate a reference path trajectory for autonomous driving according to one embodiment of the invention.

FIG. 8 is a flow diagram illustrating a process to generate a reference path trajectory for autonomous driving vehicles according to one embodiment of the invention. Process 800 may be performed by processing logic which may include software, hardware, or a combination thereof. For example, process 800 may be performed by server 103 or perception and planning system 110 of an autonomous vehicle. Referring to FIG. 8, at block 801, processing logic generates a first reference line or path based on a map information. At block 802, processing logic collects data points representing geographical coordinates of vehicles that drove on the vehicular path/lane at different points in time. At block 803, processing logic segments the first vehicular path into discrete path segments based on the collected data points. For each of the segments, at block 804, processing logic applies a smoothing function to select a subset of the collected data points that are within a predetermined proximity of the corresponding path segment. At block 805, processing logic calculates a segment reference point to represent the path segment by combining the selected data points, such that the segment reference points of the path segments are interpolated to generate a second vehicular path and the second vehicular path is used as a reference line to control ADVs driving on the first vehicular path.

In one embodiment, the first vehicular path is generated based on midpoints of a vehicular path lane of the map information. In another embodiment, the smoothing function includes a two or a three-dimensional Gaussian blur function. In another embodiment, the two or three-dimensional Gaussian blur function applies smoothing to a first and a second dimension of data points. In another embodiment, the smoothing is applied to the first dimension independent of a smoothing applied to the second dimension of the data points. In another embodiment, applying a smoothing function to the selected data points includes determining a standard deviation value to be applied for the two-dimensional Gaussian blur function.

In one embodiment, applying a smoothing function includes applying a polynomial regression function. In another embodiment, applying a smoothing function to the selected data points includes determining a degree of polynomial for the polynomial regression function. In another embodiment, segment reference points are interpolated by applying a spline function to the segment reference points of the path segments. In another embodiment, segment reference points are interpolated by applying a spiral path function to the segment reference points of the path segments.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
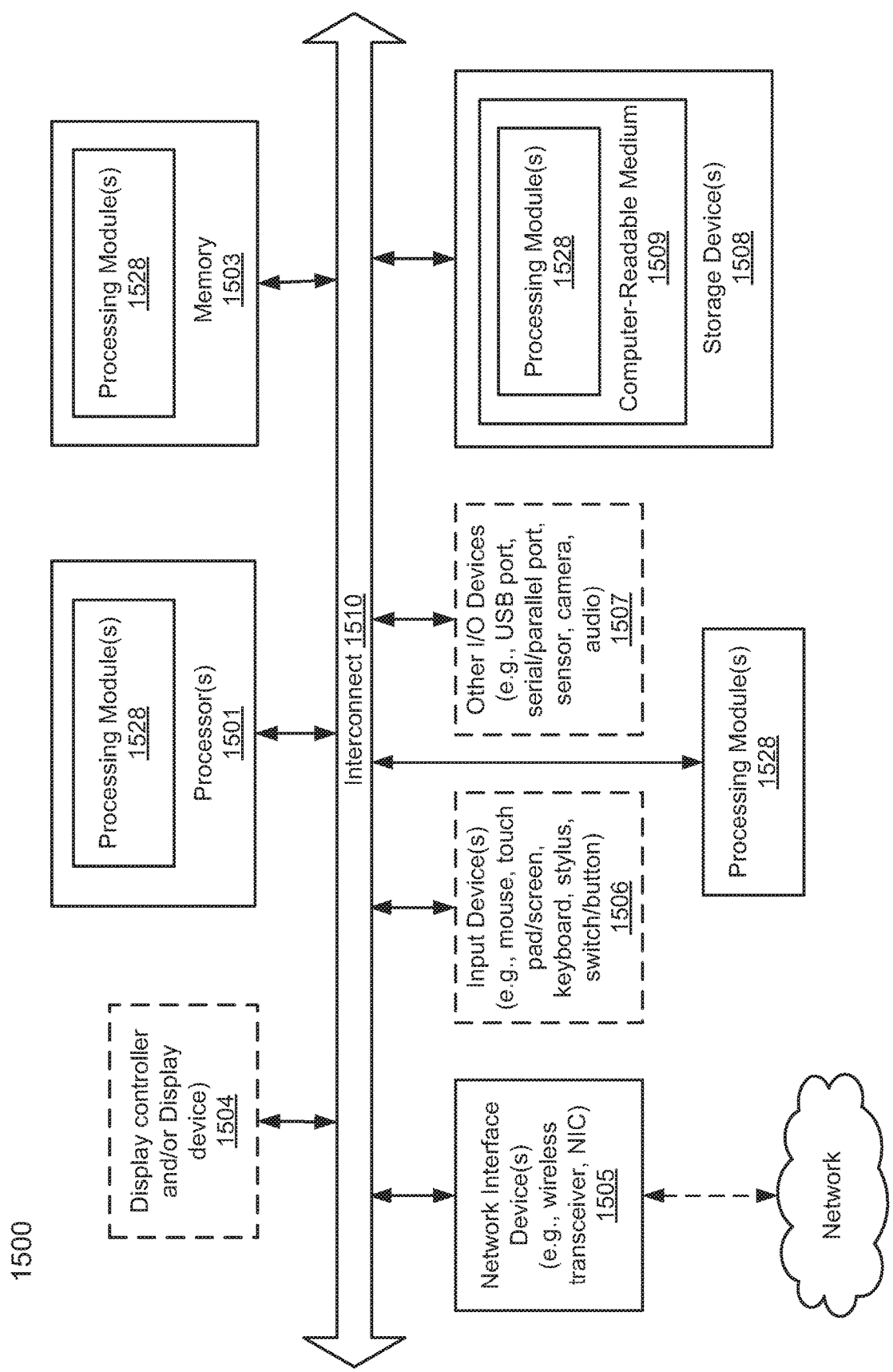
FIG. 9 is a block diagram illustrating a data processing system according to one embodiment.

FIG. 9 is a block diagram illustrating an example of a data processing system which may be used with one embodiment of the invention. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 304, control module 305, and path segments analyzer module 306. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for generating a reference path for operating an autonomous driving vehicle (ADV), the method comprising:
generating a first vehicular path based on a map information;
collecting data points representing geographical coordinates of vehicles that drove on the first vehicular path at different points in time;
segmenting the first vehicular path into discrete path segments based on the collected data points, wherein the discrete path segments are stored as key-value pairs and each key-value pair represents an interconnection by a key path segment to a value path segment, wherein each of the collected data points includes a first dimension value and a second dimension value;
for each of the path segments,
applying a smoothing function to select a subset of the collected data points that are within a predetermined proximity of the corresponding path segment, wherein the smoothing function comprises a two-dimensional Gaussian blur function to apply smoothing to a first and a second dimension of the selected data points of the collected data points; and calculating a segment reference point to represent the path segment by combining the selected data points, wherein the segment reference points of the path segments are interpolated to generate a second vehicular path; and controlling an ADV on the first vehicular path using the second vehicular path as a reference line.

2. The method of claim 1, wherein the first vehicular path is generated based on midpoints of a vehicular path lane of the map information.

3. The method of claim 1, wherein the smoothing is applied to the first dimension independent of the smoothing applied to the second dimension of the selected data points.

4. The method of claim 1, wherein applying a smoothing function to the selected data points comprises determining a standard deviation value to be applied for the two-dimensional Gaussian blur function.

5. The method of claim 1, wherein the smoothing function comprises a polynomial regression function.

6. The method of claim 5, wherein applying a smoothing function to the selected data points comprises determining a degree of polynomial for the polynomial regression function.

7. The method of claim 1, wherein the segment reference points are interpolated by applying a spline function to the segment reference points of the path segments.

8. The method of claim 1, wherein the segment reference points are interpolated by applying a spiral path function to the segment reference points of the path segments.

9. A non-transitory machine-readable medium having instructions stored therein, which when executed by a processor, cause the processor to perform operations, the operations comprising:

generating a first vehicular path based on a map information;

collecting data points representing geographical coordinates of vehicles that drove on the first vehicular path at different points in time;

segmenting the first vehicular path into discrete path segments based on the collected data points, wherein the discrete path segments are stored as key-value pairs and each key-value pair represents an interconnection by a key path segment to a value path segment, wherein each of the collected data points includes a first dimension value and a second dimension value;

for each of the path segments, applying a smoothing function to select a subset of the collected data points that are within a predetermined proximity of the corresponding path segment, wherein the smoothing function comprises a two-dimensional Gaussian blur function to apply smoothing to a first and a second dimension of the selected data points of the collected data points; and calculating a segment reference point to represent the path segment by combining the selected data points, wherein the segment reference points of the path segments are interpolated to generate a second vehicular path; and controlling an ADV on the first vehicular path using the second vehicular path as a reference line.

10. The method of claim 9, wherein the first vehicular path is generated based on midpoints of a vehicular path lane of the map information.

11. The method of claim 9, wherein the smoothing is applied to the first dimension independent of the smoothing applied to the second dimension of the selected data points.

12. The method of claim 9, wherein applying a smoothing function to the selected data points comprises determining a standard deviation value to be applied for the two-dimensional Gaussian blur function.

13. A data processing system, comprising:

a processor; and a memory coupled to the processor to store instructions, which when executed by the processor, cause the processor to perform operations, the operations including generating a first vehicular path based on a map information;

collecting data points representing geographical coordinates of vehicles that drove on the first vehicular path at different points in time;

segmenting the first vehicular path into discrete path segments based on the collected data points, wherein the discrete path segments are stored as key-value pairs and each key-value pair represents an interconnection by a key path segment to a value path segment, wherein each of the collected data points includes a first dimension value and a second dimension value;

for each of the path segments, applying a smoothing function to select a subset of the collected data points that are within a predetermined proximity of the corresponding path segment, wherein the smoothing function comprises a two-dimensional Gaussian blur function to apply smoothing to a first and a second dimension of the selected data points of the collected data points; and calculating a segment reference point to represent the path segment by combining the selected data points, wherein the segment reference points of the path segments are interpolated to generate a second vehicular path; and controlling an ADV on the first vehicular path using the second vehicular path as a reference line.

14. The method of claim 13, wherein the first vehicular path is generated based on midpoints of a vehicular path lane of the map information.

15. The method of claim 13, wherein the smoothing is applied to the first dimension independent of the smoothing applied to the second dimension of the selected data points.

16. The method of claim 13, wherein applying a smoothing function to the selected data points comprises determining a standard deviation value to be applied for the two-dimensional Gaussian blur function.

* * * * *